United States Patent
Liu et al.

(10) Patent No.: US 10,811,717 B2
(45) Date of Patent: Oct. 20, 2020

(54) ELECTROLYTE FORMATION FOR A SOLID OXIDE FUEL CELL DEVICE

(71) Applicants: Phillips 66 Company, Houston, TX (US); Georgia Tech Research Corporation, Atlanta, GA (US)

(72) Inventors: Mingfei Liu, Atlanta, GA (US); Meilin Liu, Atlanta, GA (US); Ting He, Bartlesville, OK (US)

(73) Assignees: GEORGIA TECH RESEARCH CORPORATION, Atlanta, GA (US); PHILLIPS 66 COMPANY, Houston, TX (US)

( * ) Notice: Subject to any disclaimer, the term of this patent is extended or adjusted under 35 U.S.C. 154(b) by 215 days.

(21) Appl. No.: 14/168,183

(22) Filed: Jan. 30, 2014

(65) Prior Publication Data
US 2014/0227624 A1    Aug. 14, 2014

Related U.S. Application Data

(60) Provisional application No. 61/764,354, filed on Feb. 13, 2013.

(51) Int. Cl.
*H01M 8/1253* (2016.01)
*H01M 4/88* (2006.01)
(Continued)

(52) U.S. Cl.
CPC ....... *H01M 8/1253* (2013.01); *H01M 4/8814* (2013.01); *H01M 4/8857* (2013.01);
(Continued)

(58) Field of Classification Search
CPC ............. H01M 8/1253; H01M 8/1213; H01M 4/8857; H01M 4/8889; H01M 4/9025; H01M 2008/1293
See application file for complete search history.

(56) References Cited

U.S. PATENT DOCUMENTS

| 4,436,794 A | 3/1984 | Takeuchi et al. |
| 4,591,538 A | 5/1986 | Kunz |

(Continued)

FOREIGN PATENT DOCUMENTS

| WO | WO-2006/113674 A2 | 10/2006 |
| WO | WO-2012/018297 A1 | 2/2012 |

OTHER PUBLICATIONS

Deces-Petit, C., Zhang, X., Maric, R., Effect of Sintering Aids on the Formation of Zirconia-Ceria Solution, ECS Transactions, 7(1) 2277-2282 (Year: 2007).*

(Continued)

*Primary Examiner* — Ula C Ruddock
*Assistant Examiner* — Thomas H. Parsons
(74) *Attorney, Agent, or Firm* — Fisherbroyles, LLP; Chris Perque; Richard Echler (57) ABSTRACT

A method of fabricating a SSZ/SDC bi-layer electrolyte solid oxide fuel cell, comprising the steps of: fabricating an NiO-YSZ anode substrate from a mixed NiO and yttria-stabilized zirconia by tape casting; sequentially depositing a NiO-SSZ buffer layer, a thin SSZ electrolyte layer and a SDC electrolyte on the NiO-YSZ anode substrate by a particle suspension coating or spraying process, wherein the layers are co-fired at high temperature to densify the electrolyte layers to at least about 96% of their theoretical densities; and painting/spraying a SSC-SDC slurry on the SDC electrolyte to form a porous SSC-SDC cathode. A SSZ/SDC bi-layer electrolyte cell device and a method of using such device are also discussed.

12 Claims, 9 Drawing Sheets

(51) Int. Cl.
| | |
|---|---|
| H01M 4/90 | (2006.01) |
| H01M 8/1213 | (2016.01) |
| H01M 8/126 | (2016.01) |
| H01M 8/124 | (2016.01) |

(52) U.S. Cl.
CPC ....... *H01M 4/8889* (2013.01); *H01M 4/9025* (2013.01); *H01M 8/126* (2013.01); *H01M 8/1213* (2013.01); *H01M 2008/1293* (2013.01); *H01M 2300/0074* (2013.01); *H01M 2300/0077* (2013.01); *H01M 2300/0094* (2013.01); *Y02E 60/525* (2013.01); *Y02P 70/56* (2015.11)

(56) References Cited

U.S. PATENT DOCUMENTS

| | | | |
|---|---|---|---|
| 4,659,635 | A | 4/1987 | Reiser et al. |
| 6,558,831 | B1 | 5/2003 | Doshi et al. |
| 6,767,662 | B2* | 7/2004 | Jacobson ............ H01M 4/9016 264/618 |
| 7,014,942 | B2 | 3/2006 | Gorte et al. |
| 7,045,237 | B2 | 5/2006 | Sridhar et al. |
| 7,232,626 | B2* | 6/2007 | Jacobson ............ H01M 8/0297 429/128 |
| 7,485,385 | B2 | 2/2009 | Seccombe, Jr. et al. |
| 7,527,761 | B2 | 5/2009 | Swartzlander et al. |
| 7,618,731 | B2 | 11/2009 | Kumar et al. |
| 7,842,200 | B2 | 11/2010 | Ehrman et al. |
| 8,101,316 | B2* | 1/2012 | Yoshikata ........... H01M 8/1213 429/471 |
| 8,802,316 | B1* | 8/2014 | Liu ..................... H01M 8/1213 429/479 |
| 9,070,946 | B2* | 6/2015 | Goto .................... H01M 4/861 |
| 2003/0162082 | A1 | 8/2003 | Allen et al. |
| 2006/0199058 | A1* | 9/2006 | Hiwatashi .......... H01M 4/9033 429/489 |
| 2006/0257718 | A1* | 11/2006 | Sato .................... H01M 4/8621 429/465 |
| 2008/0131748 | A1 | 6/2008 | Katagiri et al. |
| 2009/0136821 | A1* | 5/2009 | Gottmann .......... H01M 4/8885 429/405 |
| 2010/0112408 | A1 | 5/2010 | Yang et al. |
| 2010/0209816 | A1 | 8/2010 | Kwak et al. |
| 2011/0195342 | A1 | 8/2011 | Luo et al. |
| 2011/0305973 | A1 | 12/2011 | Kobayashi et al. |
| 2013/0344415 | A1* | 12/2013 | Mohanram ......... H01M 8/1004 429/482 |

OTHER PUBLICATIONS

Nov. 19, 2014 Final Office Action mailed in U.S. Appl. No. 13/596,787, filed Aug. 28, 2012.
Huang, et al., *Effects of salt composition on the electrical properties of samaria-doped ceria/carbonate composite electrolytes for low-temperature SOFCs*, Int. J. Hydrogen Energy 35 (2010) 4270-4275.
EP Mar. 24, 2015 Supplementary European Search Report issued in European Pat. App. No. 12834996.6.
Zhou, et al., *Ionic conductivity, sintering and thermal expansion behaviors of mixed ion conductor $BaZr_{0.1}Ce_{0.7}Y_{0.1}Yb_{0.1}O_{3-\delta}$ prepared by ethylene diamine tetraacetic acid assisted glycine nitrate process*, J. Power Sources 196 (2011) 5000-5006.
Dec. 31, 2014 Applicant-Initiated Interview Summary mailed in U.S. Appl. 13/596,787, filed Aug. 28, 2012.
Feb. 13, 2015 Amendment and Response to Final Office Action dated Nov. 19, 2014; and Request for Consideration Under the After Final Consideration Pilot Program 2.0, and Exhibit A—Declaration of Mingfei Liu, Meilin Liu and Ting He Under 37 C.F.R. § 1.132, with exhibits filed in U.S. Appl. No. 13/596,787, filed Aug. 28, 2012.
Mar. 12, 2015 Advisory Action Before the Filing of an Appeal Brief with attached AFCP 2.0 Decision and Examiner-Initiated Interview Summary mailed in U.S. Appl. No. 13/596,787, filed Aug. 28, 2012.
May 4, 2015 Response to Advisory Action dated Mar. 12, 2015; Supplemental Amendment and Response to Final Office Action dated Nov. 19, 2014; Petition for Three-Month Extension of Time; and Request for Continued Examination filed in U.S. Appl. No. 13/596,787, filed Aug. 28, 2012.
Aug. 11, 2015 Office Action mailed in U.S. Appl. No. 13/596,787, filed Aug. 28, 2012.
Jun. 19, 2014 Office Action mailed in U.S. Appl. No. 13/596,787, filed Aug. 28, 2012.
Sep. 19, 2014 Amendment and Response to Office Action dated Jun. 19, 2014 in U.S. Appl. No. 13/596,787, filed Aug. 28, 2012.
Ding, et al., *High reactive $Ce_{0.8}Sm_{0.2}O_{1.9}$ powders via a carbonate co-precipitation method as electrolytes for low-temperature solid oxide fuel cells*, Solid State Ionics 179(21-26) (2008) 896-899.
Eguchi, et al., *Electrical-properties of ceria-based oxides and their application to solid oxide fuel-cells*, Solid State Ionics 52(1-3) (1992) 165-172.
Hirabayashi, et al., *Design of a reduction-resistant $Ce_{0.8}Sm_{0.2}O_{1.9}$ electrolyte through growth of a thin $BaCe_{1-x}Sm_xO_{3-alpha}$ layer over electrolyte surface*, Electrochemical & Solid-State Letters 7(10) (2004) A318-A320.
Hirabayashi, et al., *Improvement of a reduction-resistant $Ce_{0.8}Sm_{0.2}O_{1.9}$ electrolyte by optimizing a thin $BaCe_{1-x}Sm_xO_{3-alpha}$ layer for intermediate-temperature SOFCs*, Solid State Ionics 176(9-10) (2005) 881-887.
Huang, et al., *Double perovskites as anode materials for solid-oxide fuel cells*, Science 312(5771) (Apr. 14, 2006) 254-257.
Inoue, et al., *Study of a solid oxide fuel cell with a ceria-based solid electrolyte*, Solid State Ionics 35(3-4) (1989) 285-291.
Jiang, et al., *Novel structured mixed ionic and electronic conducting cathodes of solid oxide fuel cells*, Solid State Ionics 176(15-16) (2005) 1351-1357.
Liu, et al., *An efficient SOFC based on Samaria-Doped Ceria (SDC) electrolyte*, J. Electrochem. Soc. 159(6) (2012) B661-B665.
Liu, et al., *Comparative study on the performance of tubular and button cells with YSZ membrane fabricated by a refined particle suspension coating technique*, Int. J. Hydrogen Energy 35(19) (2010) 10489-10494.
Liu, et al., *Direct liquid methanol-fueled solid oxide fuel cell*, Journal of Power Sources 185(1) (2008) 188-192.
Liu, et al., *Direct octane fuel cells: A promising power for transportation*, Nano Energy 1(3) (2012) 448-455.
Liu, et al., *High-performance cathode-supported SOFCs prepared by a single-step co-firing process*, J. Power Sources 182(2) (2008) 585-588.
Liu, et al., *Rational SOFC material design: New advances and tools*, Materials Today 14(11) (Nov. 2011) 534-546.
Liu, et al., *YSZ-based SOFC with modified electrode/electrolyte interfaces for operating at temperature lower than 650 degrees C*, J. Power Sources 180(1) (2008) 215-220.
Shao, et al., *A high-performance cathode for the next generation of solid-oxide fuel cells*, Nature 431(7005) (Sep. 9, 2004) 170-173.
Tsoga, et al., *Total electrical conductivity and defect structure of $ZrO_2$—$CeO_2$—$Y_2O_3$—$Gd_2O_3$ solid solutions*, Solid State Ionics 135(1-4) (Nov. 2000) 403-409.
Yang, et al., *Enhanced sulfur and coking tolerance of a mixed ion conductor for SOFCs: $BaZr_{0.1}Ce_{0.7}Y_{0.2-x}Yb_xO_{3-delta}$*, Science 326(5949) (2009) 126-129.
Yang, et al., *Promotion of water-mediated carbon removal by nanostructured barium oxide/nickel interfaces in solid oxide fuel cells*, Nat. Comm'n 2(357) (2011) 1-9.
Zhan, et al., *An octane-fueled solid oxide fuel cell*, Science 308(5723) (May 6, 2005) 844-847.
Zhang, et al., *Solid oxide fuel cells with bi-layered electrolyte structure*, J. Power Sources 175(2) (2008) 800-805.
Zhao, et al., *$BaZr_{0.1}Ce_{0.7}Y_{0.2}O_{3-delta}$ as an electronic blocking material for microtubular solid oxide fuel cells on doped ceria electrolyte*, Electrochemistry Comm'ns. 13(5) (2011) 450-453.
Zuo, et al., *$Ba(Zr_{0.1}Ce_{0.7}Y_{0.2})O_{3-delta}$ as an electrolyte for low-temperature solid-oxide fuel cells*, Adv. Mater. 18(24) (2006) 3318-3320.
PCT May 20, 2014 International Search Report and Written Opinion established in PCT/US2014/013729 filed on Jan. 30, 2014.

(56) References Cited

OTHER PUBLICATIONS

International Search Report and Written Opinion dated Dec. 3, 2012 in International Application PCT/2012/052690.
New Ceramic Material May Expand Uses For Solid Oxide Fuel Cells, Renewable Energy focus.com, Oct. 1, 2009 [retrieved on Nov. 14, 2012], Retrieved from: <URL: http://www.renewableenergyfocus.com/view/4311/new-ceramic-material-may-expand-uses-for-solid-oxide-fuel-cells/ entire document.
Li, et al., *Combining proton conductor $BaZr_{0.8}Y_{0.2}O_{3-delta}$ with carbonate: Promoted densification and enhanced proton conductivity*, Electrochem. Comm'ns. 13 (2011) 694-697.
Tanimoto, et al., *Cell performance of molten-carbonate fuel-cell with alkali and alkaline-earth carbonate mixtures*. J. Power Sources 39(3) (1992) 285-297.
Lagergren, et al., *Experimental determination of effective conductivities in porous molten carbonate fuel cell electrodes*, Electrochimica Acta 44(2-3) (1998) 503-511.
Chen et al., *Anode-supported tubular SOFCs based on $BaZr_{0.1}Ce_{0.7}Y_{0.1}Yb_{0.1}O_{3-delta}$ electrolyte fabricated by dip coating*, Electrochem. Comm'ns. 13 (2011) 615-618.

\* cited by examiner

ELECTROLYTE FORMATION FOR A SOLID OXIDE FUEL CELL DEVICE

CROSS-REFERENCE TO RELATED APPLICATIONS

The present application claims priority to U.S. Provisional Patent Application No. 61/764,354, filed on Feb. 13, 2013, for "Electrolyte Formation for a Solid Oxide Fuel Cell Device."

TECHNICAL FIELD

This invention relates generally to electrolytes for a solid oxide fuel cell (SOFC) device, and, more particularly, to a SSZ/SDC bi-layer electrolyte cell. The invention relates to the formation and application of a SSZ/SDC bi-layer electrolyte cell for intermediate temperature SOFC applications.

BACKGROUND OF THE INVENTION

SOFCs are the cleanest and most efficient systems for direct conversion to electricity from a wide variety of fuels, from hydrogen to hydrocarbons, coal gas, bio-derived fuels, and other renewable solid wastes [1-6]. Recently, intermediate-temperature SOFCs (IT-SOFCs) have attracted worldwide attention because lowering the operating temperature (from 1000° C. to 500° C.-700° C.) increases the selection of potential materials, reduces material costs due to the wider selection and improves the reliability and operational life of SOFC systems [7-10]. Lowering the operating temperature, however, also creates a number of material problems that are associated with increases in the electrolyte resistance and decreases in rates of the electro-catalytic reactions (electrode polarization). Both factors result in a significantly decreased performance. Hence, in order to achieve excellent performance at a lower temperature range, the development of a new SOFC configuration (structure and materials) is essential for SOFC commercialization.

Doped ceria has been widely studied as electrolyte materials for IT-SOFCs due to its much higher ionic conductivity in the intermediate temperature range. Remarkably high peak power densities (at least about 1 W/cm$^2$) at an operating temperature of 600° C. have been demonstrated in a single cell based upon an anode-supported SDC electrolyte membrane [11]. However, the electronic conductivity of doped ceria under fuel cell operating conditions reduces the open circuit voltage (OCV) and, hence, energy conversion efficiency with thinner electrolyte membrane at higher operating temperatures. An additional disadvantage of a doped ceria electrolyte is the volume expansion associated with partial reduction of ceria (Ce4+ to Ce3+) upon exposure to a reducing atmosphere, which may result in severe structural and mechanical degradation (such as micro-crack and delamination). In order to better utilize the high ionic conductivity of doped ceria electrolyte, different approaches have been explored to block the electronic conduction of the SDC membrane and enhance the OCV of the SDC-based cells (e.g., BCS/SDC bi-layer [12, 13], YSZ/SDC bi-layer [14, 15], SSZ/SDC bi-layer [16] and NiO-BZCYYb/SDC [17]). Though improved OCVs have been demonstrated in this previous work, the performance was still much lower than that of SDC-based cells. Another limitation of the bi-layer concept (e.g., SSZ/SDC or YSZ/SDC) is that a high co-firing temperature will cause inter-diffusion (or solid state reaction) between electrolyte layers at co-firing conditions [16, 18, 19], which greatly reduces the conductivity and introduces significant electronic conduction [19], resulting in performance loss.

Compared to other zirconia-based electrolytes, scandia and ceria stabilized zirconia $((Sc_2O_3)_{0.1}(CeO_2)_{0.01}(ZrO_2)_{0.89}$, SSZ) has a much higher pure ionic conductivity at intermediate temperature. Hence, SSZ is an ideal electronic blocker for the SDC-based electrolyte. However, the material cost of SSZ is much higher than that of conventional YSZ.

Thus, a new SOFC configuration based upon a thin film, bi-layer electrolyte membrane (SSZ/SDC) supported by a conventional Ni-YSZ substrate is needed to lower the operating temperature and to improve the performance. Such thin film, bi-layer electrolyte materials will be particularly important to the commercialization of SOFCs, since the electrolyte is a primary source of power losses in the fuel cell at low temperatures.

SUMMARY OF THE INVENTION

A new SOFC configuration has been developed based upon a thin-film, bi-layer electrolyte membrane (SSZ/SDC), which is supported by a conventional Ni-YSZ substrate. The SSZ electrolyte film was thin enough (about 1 μm) to reduce the ohmic resistance but thick enough to block the electronic conduction of the SDC electrolyte membrane. A set of unique fabrication procedures (including membrane fabrication and sintering control) have been developed to fabricate the cells with controlled thickness and density of the SSZ film and SDC membrane. Excellent performance and stability was demonstrated at operating temperatures of 600° C. to 700° C. when humidified hydrogen was used as a fuel and ambient air was used as an oxidant.

It is anticipated that the new SOFC configuration (structure and materials) will significantly increase the energy conversion efficiency and power density compared to cells with a SDC-based electrolyte membrane but without a zirconia-based electrolyte film. It is also expected that the SOFC will reduce the operating temperature and widen the selection of materials. This will enable the use of much less expensive materials for the SOFC components such as electrodes, interconnects, and manifolds. Additional benefits of a reduced operating temperature include significantly improved stability of materials and reliability of the SOFC system. The increased material selectivity and flexibility will likely reduce fabrication costs.

These and other objects, features, and advantages will become apparent as reference is made to the following detailed description, preferred embodiments, and examples, given for the purpose of disclosure, and taken in conjunction with the accompanying drawings and appended claims.

BRIEF DESCRIPTION OF THE DRAWINGS

For a further understanding of the nature and objects of the present inventions, reference should be made to the following detailed disclosure, taken in conjunction with the accompanying drawings, in which like parts are given like reference numerals, and wherein.

DETAILED DESCRIPTION OF PREFERRED EMBODIMENTS OF THE INVENTION

The following detailed description of various embodiments of the present invention references the accompanying drawings, which illustrate specific embodiments in which the invention can be practiced. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains. Therefore, the scope of the present invention is defined only by the appended claims, along with the full scope of equivalents to which such claims are entitled.

Figure 5A:
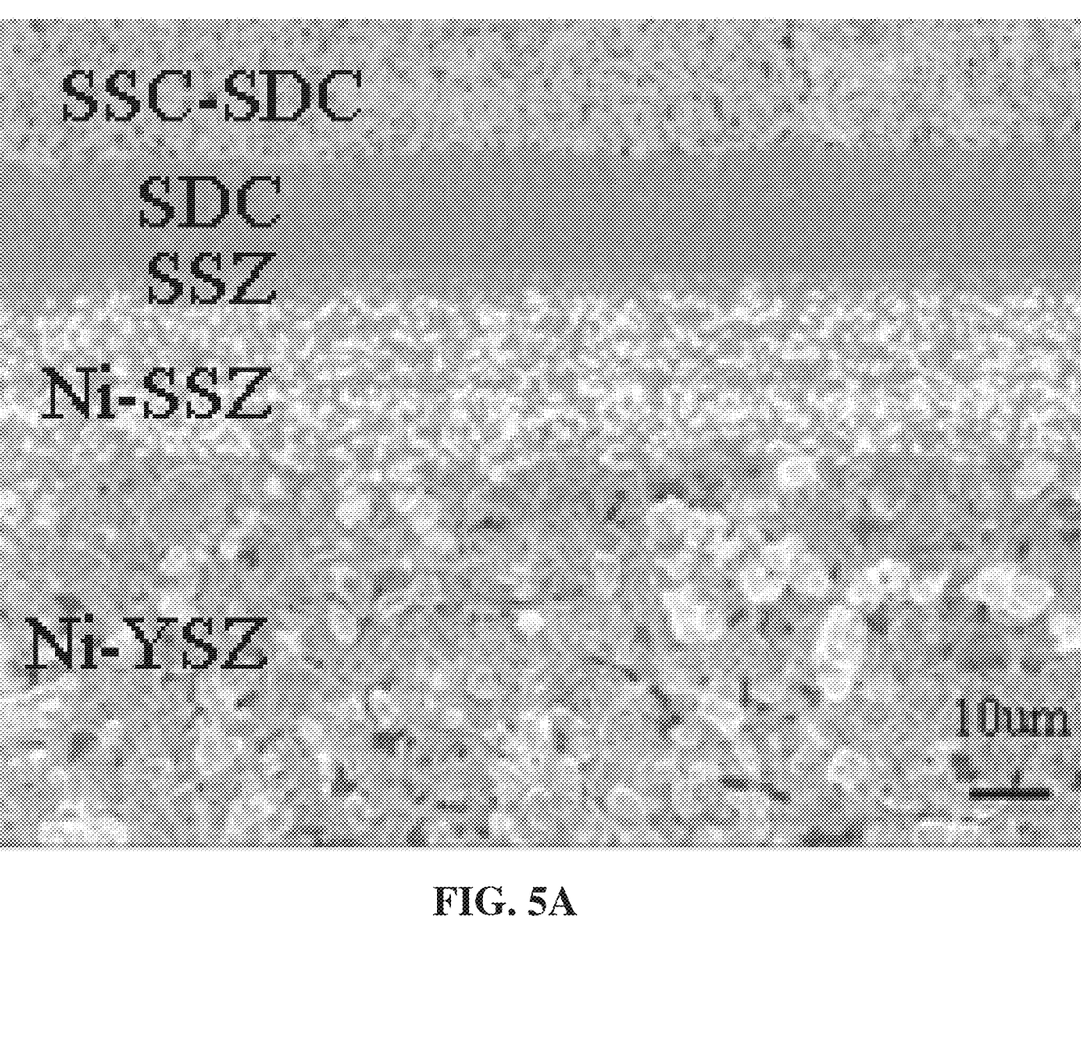
FIG. 5A illustrates a cross-sectional view of the SSZ/SDC bi-layer electrolyte cell co-fired at 1250° C.

This invention discloses the formation and application of the SSZ/SDC bi-layer electrolyte for intermediate temperature SOFC applications. See FIGS. 1 and 5. As illustrated in FIG. 5A, a conventional NiO-YSZ substrate was used to support the thin membrane cell. In an embodiment, the SSZ electrolyte film is thin enough (about 1 µm) to reduce the ohmic resistance but thick enough to block the electronic conduction of the SDC electrolyte membrane. See FIGS. 5A & 5B. In an embodiment, a high reactive SDC powder, synthesized via a carbonate co-precipitation method [20], was used for SDC membrane fabrication to lower the sintering temperature of electrolyte membranes. In an embodiment, the new SOFC configuration provided excellent performance at the operating temperatures of 600° C. to 700° C.

EXAMPLES

SOFC Fabrication: Button cells with a configuration Ni-YSZ/Ni-SSZ/SSZ/SDC/SSC-SDC were fabricated. First, a NiO-YSZ anode substrate was fabricated from a mixed NiO (Alfa) and yttria-stabilized zirconia (8YSZ, Daiichi Kigenso, Japan) (weight ratio of about 55:45) by tape casting (about 800 µm thick and punched to about ½ inch in diameter), followed by pre-firing at about 850° C. for about 2 hours. See e.g., FIG. 5A. In an embodiment, the NiO-YSZ anode substrate may be fabricated to be about 200 to about 1000 µm thick. Second, a NiO-SSZ buffer ($(Sc_2O_3)_{0.1}(CeO_2)_{0.01}(ZrO_2)_{0.89}$, Fuel Cell Materials) (about 25 µm), a thin SSZ electrolyte layer (about 1 µm), and a SDC electrolyte ($Sm_{0.2}Ce_{0.8}O_{2-\delta}$, synthesized via carbonate co-precipitation process [20, 21]) (about 15 µm) were sequentially deposited on the NiO-YSZ anode substrate by a particle suspension coating process [22, 23] to form an active layer, followed by co-firing at high temperatures to densify the electrolyte layers. Id. In an embodiment, the thin SSZ electrolyte layer may be fabricated to be about 1 to about 5 µm thick. In an embodiment, the SDC electrolyte may be fabricated to be about 10 to about 50 µm thick. In an embodiment, the active layer was co-fired at about 1200° C. to about 1400° C. to densify the electrolyte layers to about 96% to about 98% of their theoretical densities. In other words, the original thickness of the electrolyte layers is reduced by about 20%. Id. In an embodiment, the active layer was co-fired at about 1250° C. to densify the electrolyte layers to about 96% of their theoretical densities. Finally, SSC and SDC powders at a weight ratio of about 7:3 were mixed with a binder (V-006, Heraeus, Germany) and acetone to form a cathode slurry, which was brush-painted on the SDC electrolyte, followed by pre-firing at about 950° C. for about 2 hours to form a porous SSC-SDC cathode. Id.

SOFC Testing: The whole SSZ/SDC bi-layer electrolyte cell was mounted and sealed on a fuel cell testing fixture, and then tested with humidified hydrogen or natural gas (Atlanta City Gas) as fuel and ambient air as oxidant. Suitable fuels include hydrogen, hydrocarbons (e.g., methane, natural gas, ethane, propane, butane, and $C_1$ to $C_4$ alcohols), coal gas, bio-derived fuels, and other renewable solid wastes and mixtures thereof, and suitable oxidants include ambient air, oxygen and mixtures thereof. The SSZ/SDC bi-layer electrolyte cell performance and the long-term electrochemical performance were examined with an Arbin multi-channel electrochemical testing system (MSTAT). AC impedance measurements were conducted using a Solartron 1255 HF frequency response analyzer, which was interfaced with an EG&G PAR potentiostat (Model 273A) with an amplitude of 10 mV in the frequency range from 100 kHz to 0.1 Hz.

Effect of Sintering Temperature: In a bi-layer electrolyte structure, the inter-diffusion (or reaction) between electrolyte layers at co-firing conditions is a primary concern [16, 18, 19]. It has been previously reported that the inter-diffusion formed the $(Zr,Ce)O_2$-based solid solution, the conductivity of which is 2-4 times lower than that of the SSZ, is one to two orders of magnitude lower than that of the SDC [19]. Table 1 includes the ionic conductivity ($\sigma_i$) and electronic conductivity ($\sigma_e$) of YSZ, GDC, and the mixed composites at 800° C. [19].

TABLE 1

Ionic conductivity ($\sigma_i$) and electronic conductivity ($\sigma_e$) of YSZ, GDC and the mixed composites at 800° C. [19]

| Material | Nominal composition | $\sigma_i$ (Sm$^{-1}$) | $\sigma_e$ (Sm$^{-1}$) |
|---|---|---|---|
| YSZ | $Zr_{0.85}Y_{0.15}O_{1.93}$ | 5.4 | $7.29 \times 10^{-11}$ |
| GDC | $Ce_{0.80}Gd_{0.20}O_{1.56}$ | 8.7 | $8.18 \times 10^{-4}$ |
| Reaction product | $Ce_{0.37}Zr_{0.38}Gd_{0.18}Y_{0.07}O_{1.67}$ | 0.125 | $3.99 \times 10^{-4}$ |
| Interlayer | $Ce_{0.43}Zr_{0.43}Gd_{0.10}Y_{0.04}O_{1.93}$ | 0.603 | $3.88 \times 10^{-4}$ |

Figure 1A:
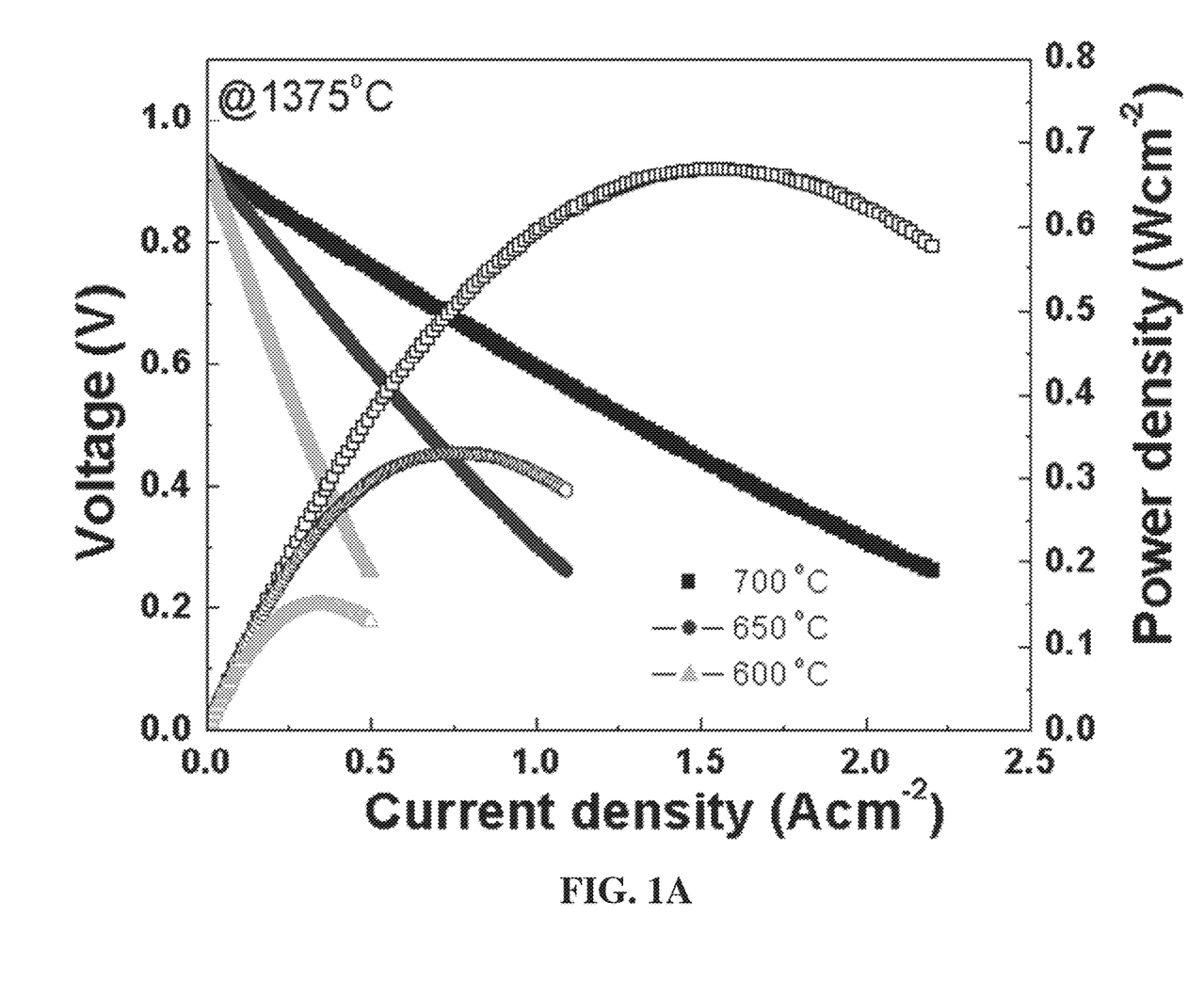
FIG. 1A illustrates a chart of current density (A/cm$^2$) verses voltage (V) and power density (W/cm$^2$) for a SSZ/SDC bi-layer electrolyte cell tested with humidified hydrogen as fuel and ambient air as oxidant, co-fired at 1375° C., and operated at 600° C., 650° C. and 700° C.
Figure 1B:
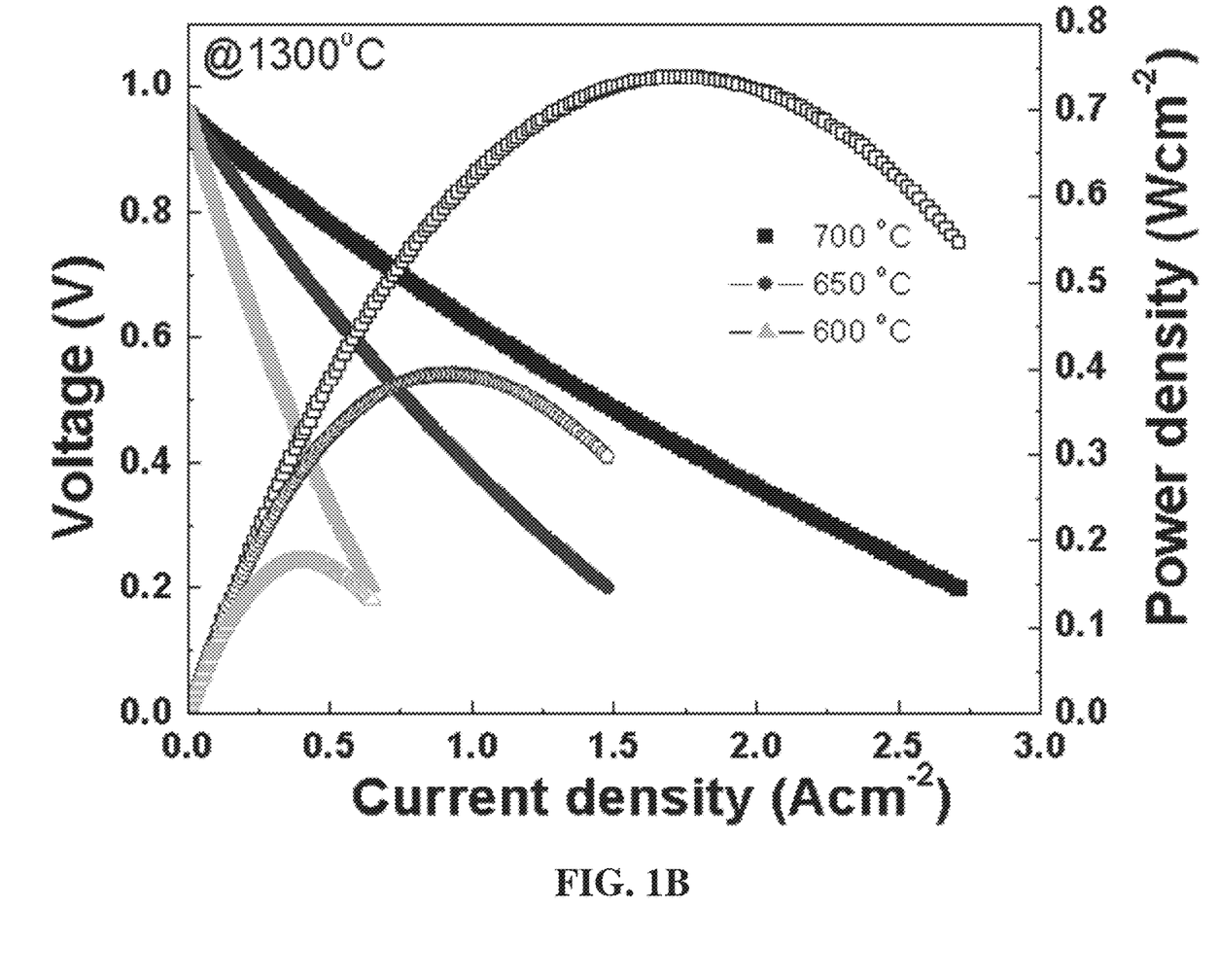
FIG. 1B illustrates a chart of current density (A/cm$^2$) verses voltage (V) and power density (W/cm$^2$) for the SSZ/SDC bi-layer electrolyte cell tested with humidified hydrogen as fuel and ambient air as oxidant, co-fired at 1300° C., and operated at 600° C., 650° C. and 700° C.
Figure 1C:
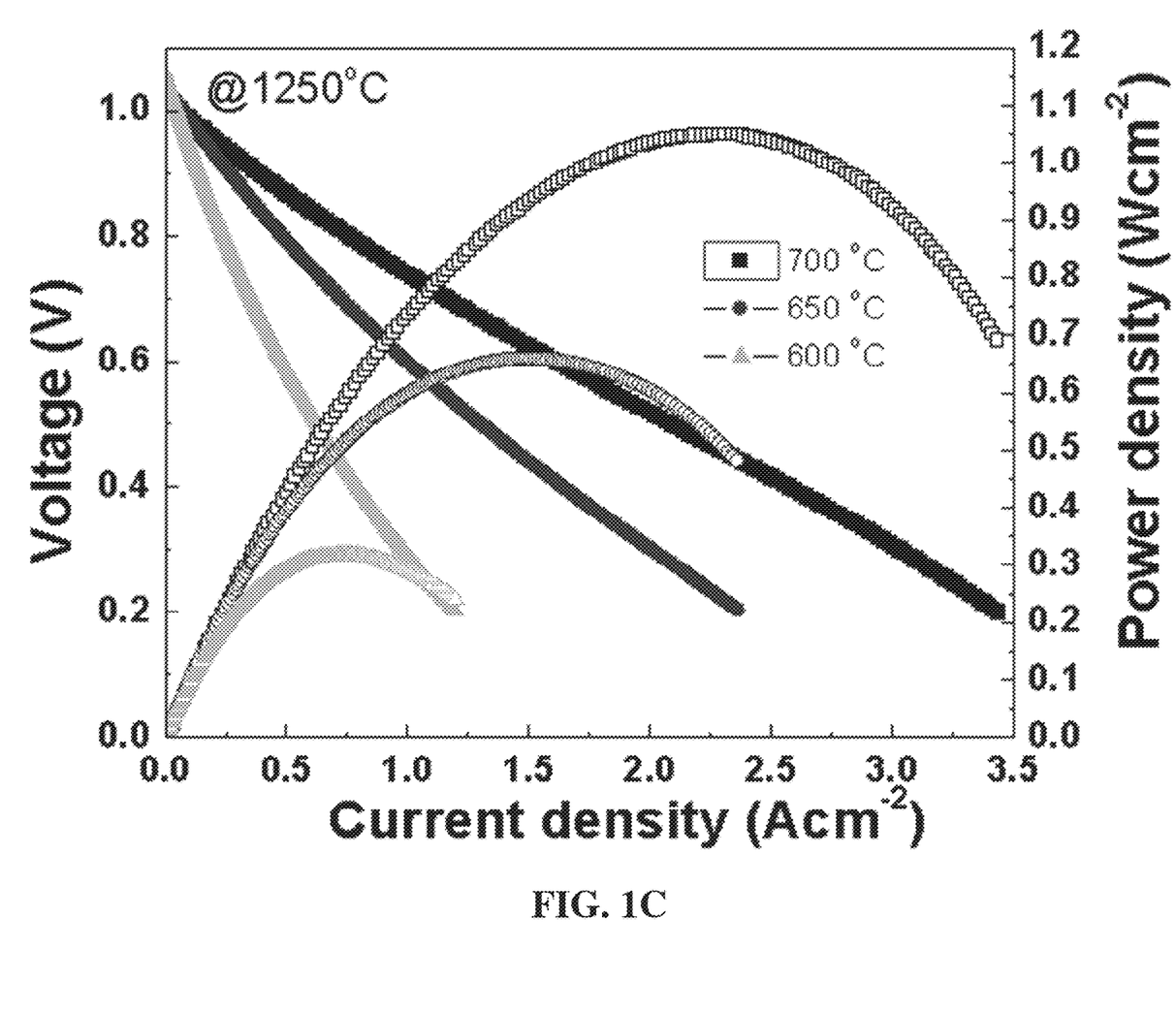
FIG. 1C illustrates a chart of current density (A/cm$^2$) verses voltage (V) and power density (W/cm$^2$) for the SSZ/SDC bi-layer electrolyte cell tested with humidified hydrogen as fuel and ambient air as oxidant, co-fired at 1250° C., and operated at 600° C., 650° C. and 700° C.
Figure 2:
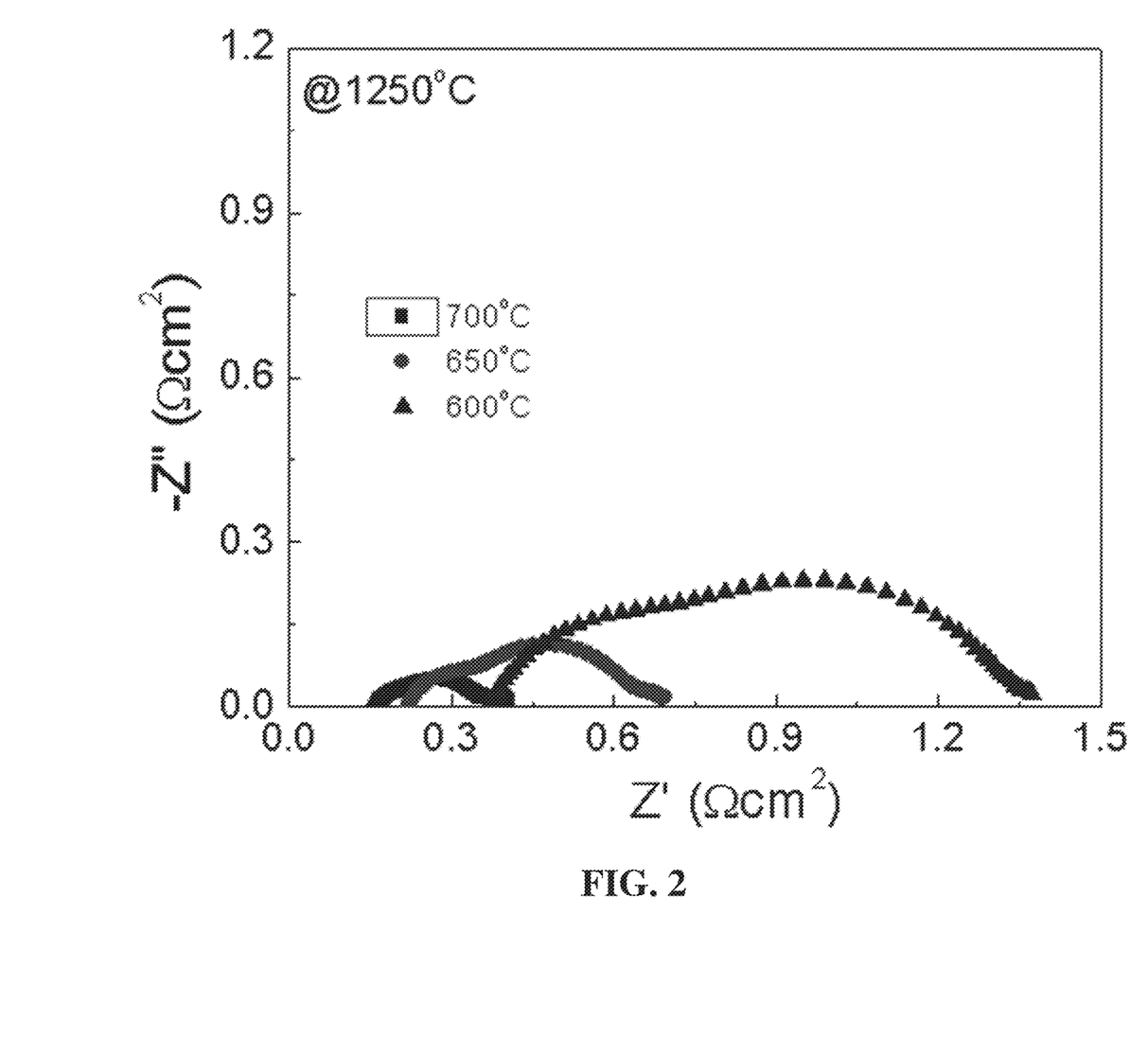
FIG. 2 illustrates a chart of impedance response of SSZ/SDC bi-layer electrolyte cells co-fired at 1250° C., and operated at 600° C., 650° C. and 700° C. under OCV condition.
Figure 4:
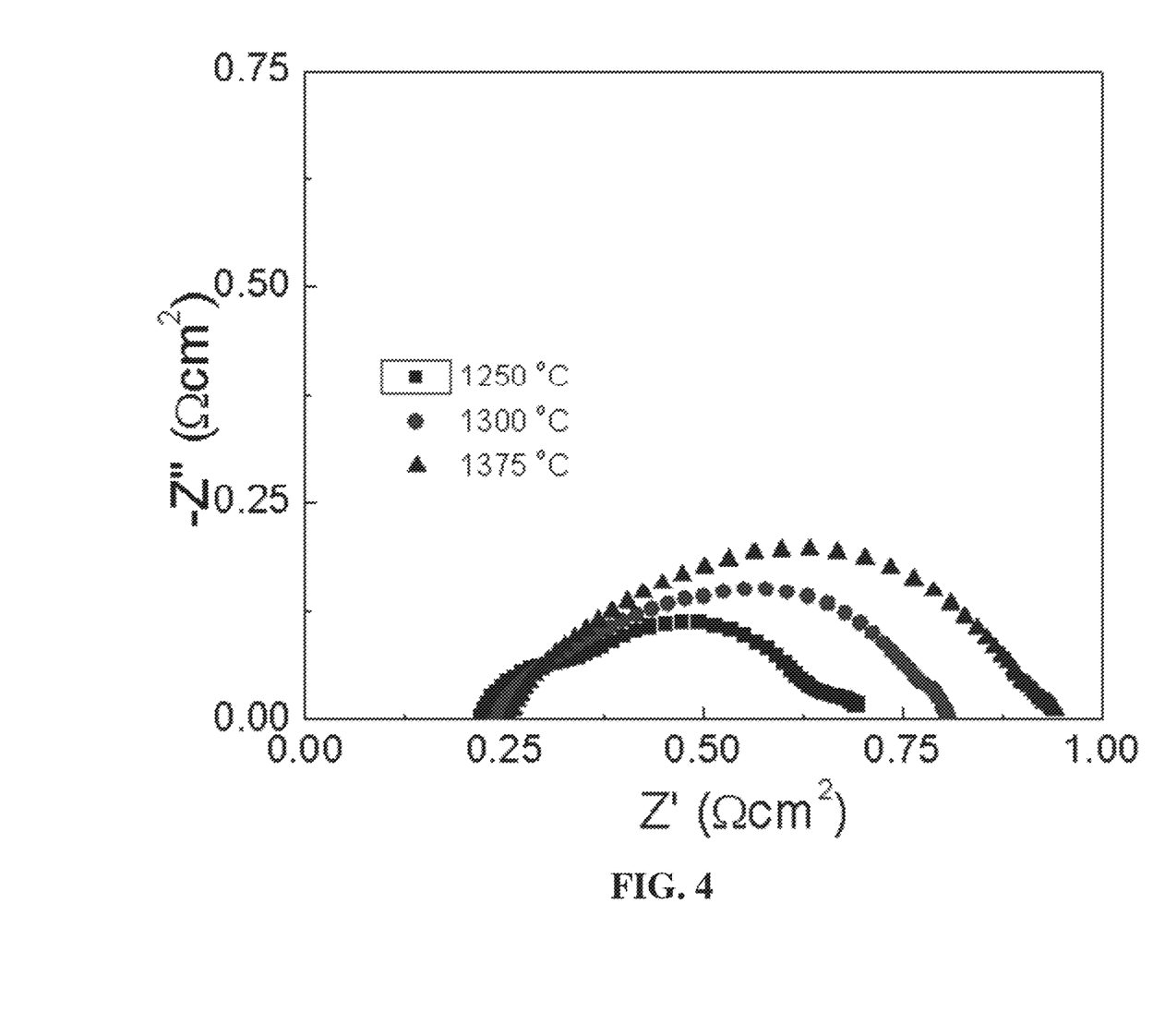
FIG. 4 illustrates impedance response of SSZ/SDC bi-layer electrolyte cells co-fired at 1250° C., 1300° C. and 1375° C., and operated at 650° C. under OCV condition, showing the effect of co-firing temperature on the impedance response on the SSZ/SDC bi-layer cells.

FIGS. 1A-1C illustrate performance data for three SSZ/SDC bi-layer electrolyte cells tested with humidified hydrogen at the anode and ambient air at the cathode, co-fired at 1375° C., 1300° C. and 1250° C., respectively, and operated at 600° C., 650° C. and 700° C. As expected, the performance of the SSZ/SDC bi-layer electrolyte cells increases as co-firing temperature decreases. For example, the maximum power densities are about 0.67 W/cm², about 0.75 W/cm² and about 1.05 W/cm² for the SSZ/SDC bi-layer electrolyte cells co-fired at 1375° C., 1300° C. and 1250° C., respectively, and operated at 700° C. See FIGS. 1A-1C. The higher performance achieved at lower firing temperature may be due to the fact that lower co-firing temperatures alleviate the reaction/inter-diffusion between SSZ and SDC. Id. At corresponding test temperatures, the OCV of the SSZ/SDC bi-layer electrolyte cells decreases as co-firing temperatures increase. See e.g., FIGS. 2 & 4. In these SSZ/SDC bi-layer electrolyte cells, the thickness of the SSZ and SDC layers are about 1 μm and about 15 μm, respectively. See FIGS. 5A-5B. The lower OCV achieved in the SSZ/SDC bi-layer electrolyte cell when co-fired at higher temperature may be due to the inter-diffusion between SSZ and SDC, which consumes the SSZ layer and reduces the contribution of electronic blocking effect from SSZ. See FIGS. 2 & 4. At a co-firing temperature of 1250° C., however, the SZZ/SDC bi-layer electrolyte cell reached a high OCV and an excellent performance. See FIG. 2. The OCV values are about 1.022 V, about 1.041 V, and about 1.057 V at operating temperatures of 700° C., 650° C., and 600° C., respectively. Id. These OCV values are very close to the theoretical Nernst potentials, indicating that the about 1 μm thick SSZ electrolyte layer co-fired with SDC significantly blocks the electronic conduction of SDC at these operating conditions. Maximum powder densities of the cell are about 1.05 W/cm², about 0.66 W/cm², and about 0.32 W/cm² at operating temperatures of 700° C., 650° C., and 600° C., respectively. See FIG. 1C. The performance is much higher than previous results with the YSZ/SDC, BCS/SDC SSZ/SDC bi-layer structures, indicating that the reducing the co-firing temperature of SSZ/SDC bi-layer will be an important approach to best utilize the SDC electrolyte for intermediate temperature SOFCs with enhanced energy conversion efficiency.

Figure 3:
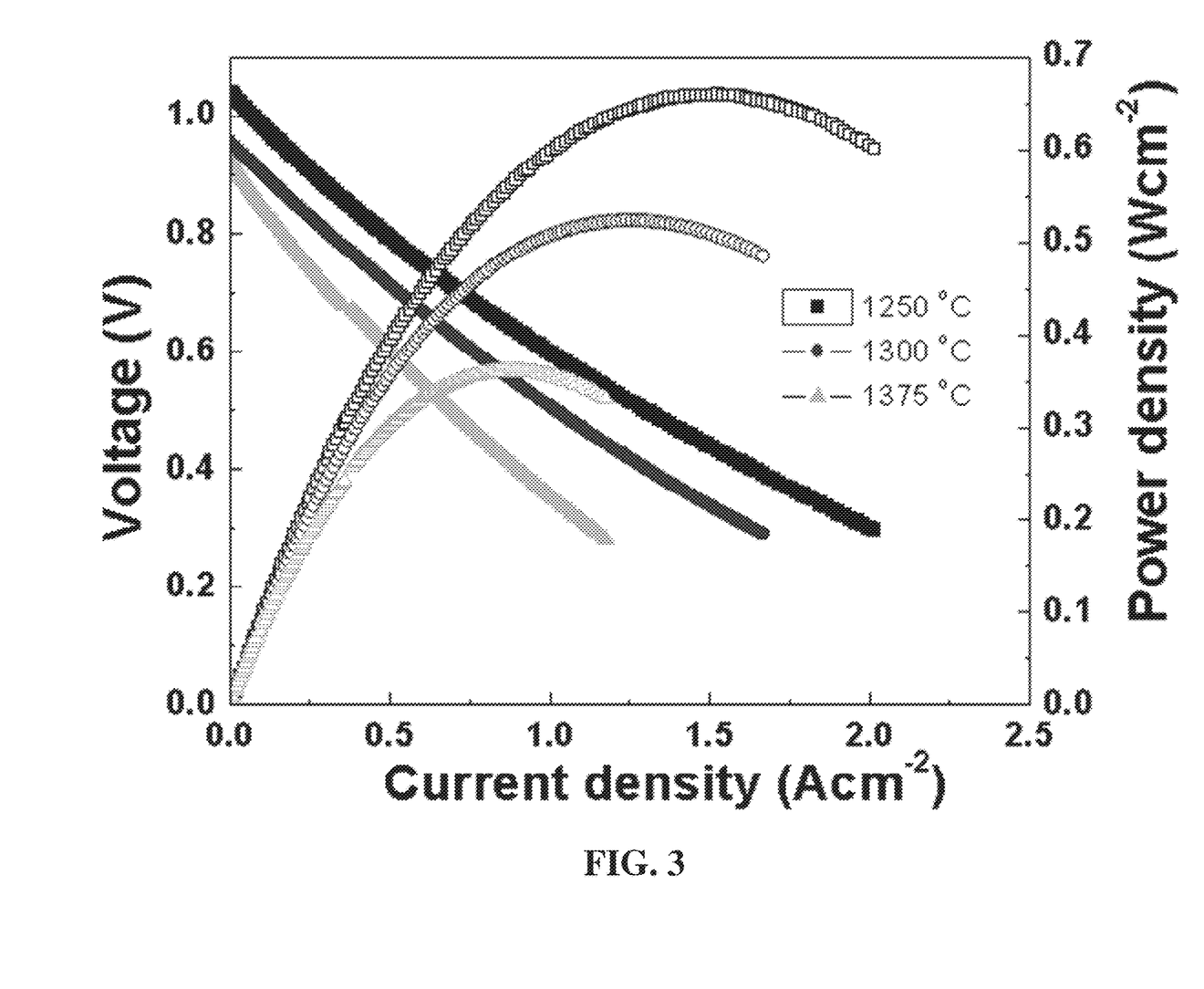
FIG. 3 illustrates a chart of current density (A/cm$^2$) verses voltage (V) and power density (W/cm$^2$) for SSZ/SDC bi-layer electrolyte cells co-fired at 1250° C., 1300° C. and 1375° C., and operated at 650° C., showing the effect of co-firing temperature on the performance of the SSZ/SDC bi-layer.

FIG. 3 illustrates a comparison of three SSZ/SDC bi-layer electrolyte cells co-fired at 1250° C., 1300° C. and 1375° C., respectively, and operated at 650° C. Clearly, both the performance and the OCV are increased as co-firing temperatures are decreased. Id. As discussed above, the higher co-firing temperatures increase the inter-diffusion of the SSZ and SDC, which was further confirmed by the impedance results shown in FIG. 4. Both bulk resistance and interfacial resistance are increased as the co-firing temperature is increased. See FIGS. 3 & 4.

Figure 5B:
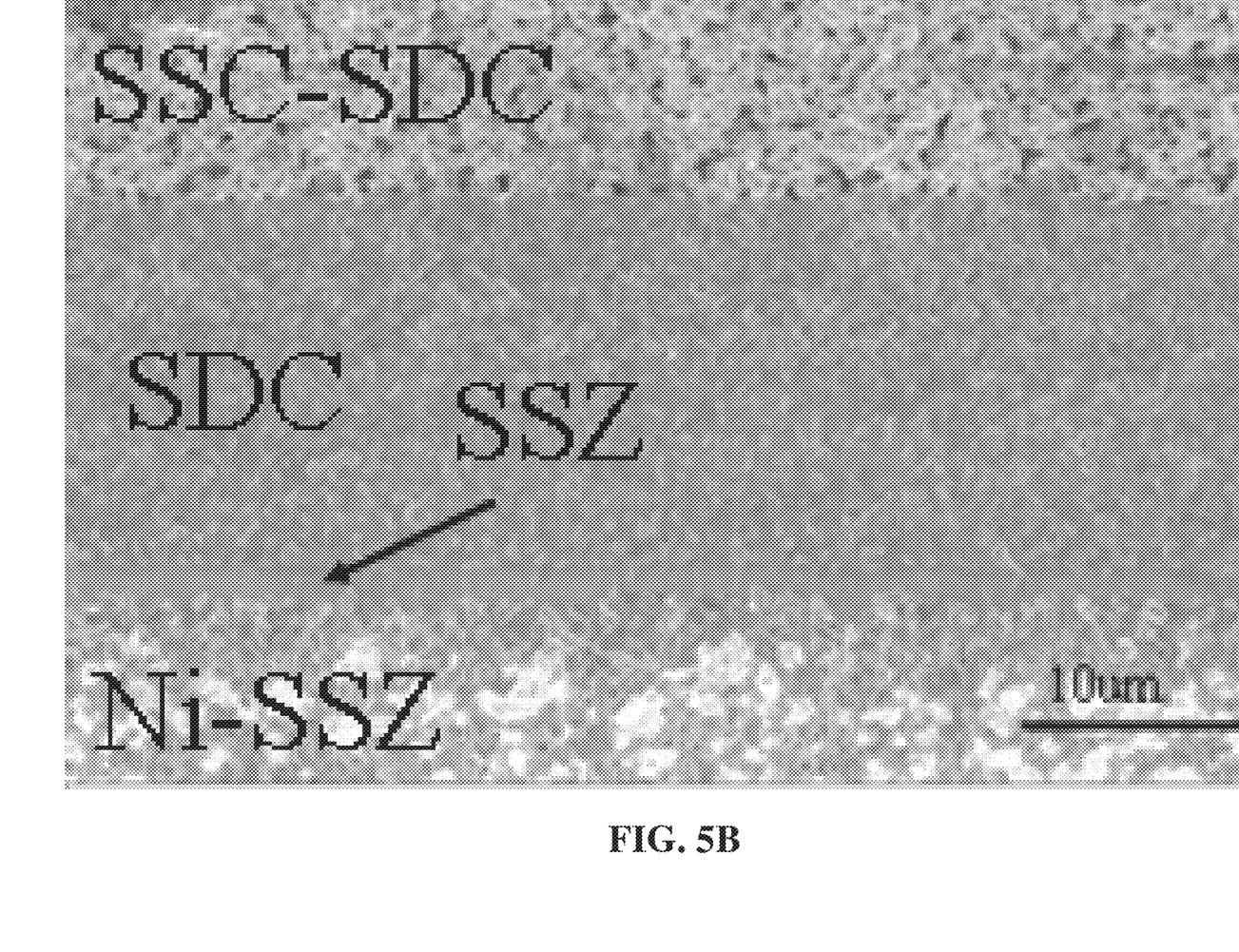
FIG. 5B illustrates an expanded cross-sectional view of the SSZ/SDC electrolyte layer for the SSZ/SDC bi-layer electrolyte cell of FIG. 5A.

A SSZ/SDC bi-layer electrolyte cell structure is illustrated in FIG. 5. FIG. 5A shows a cross-sectional view of the SSZ/SDC bi-layer electrolyte cell co-fired at 1250° C., and FIG. 5B shows an expanded cross-sectional view of the SSZ/SDC bi-layer electrolyte layer of the SSZ/SDC bi-layer electrolyte cell co-fired at 1250° C. The SSC-SDC layer forms the cathode, SDC and SSZ layers form the electrolyte, and the Ni-SSZ and Ni-YSZ layers form the anode. See FIG. 5A. As illustrated in FIG. 5A, a uniform thin layer of Ni-SSZ, SSZ and SDC is deposited (and well-adhered) to the porous Ni-YSZ anode substrate. As discussed above, the thickness of the Ni-SSZ, SSZ and SDC layers is about 25 μm, about 1 μm, and about 15 μm, respectively. See FIG. 5A.

Figure 6:
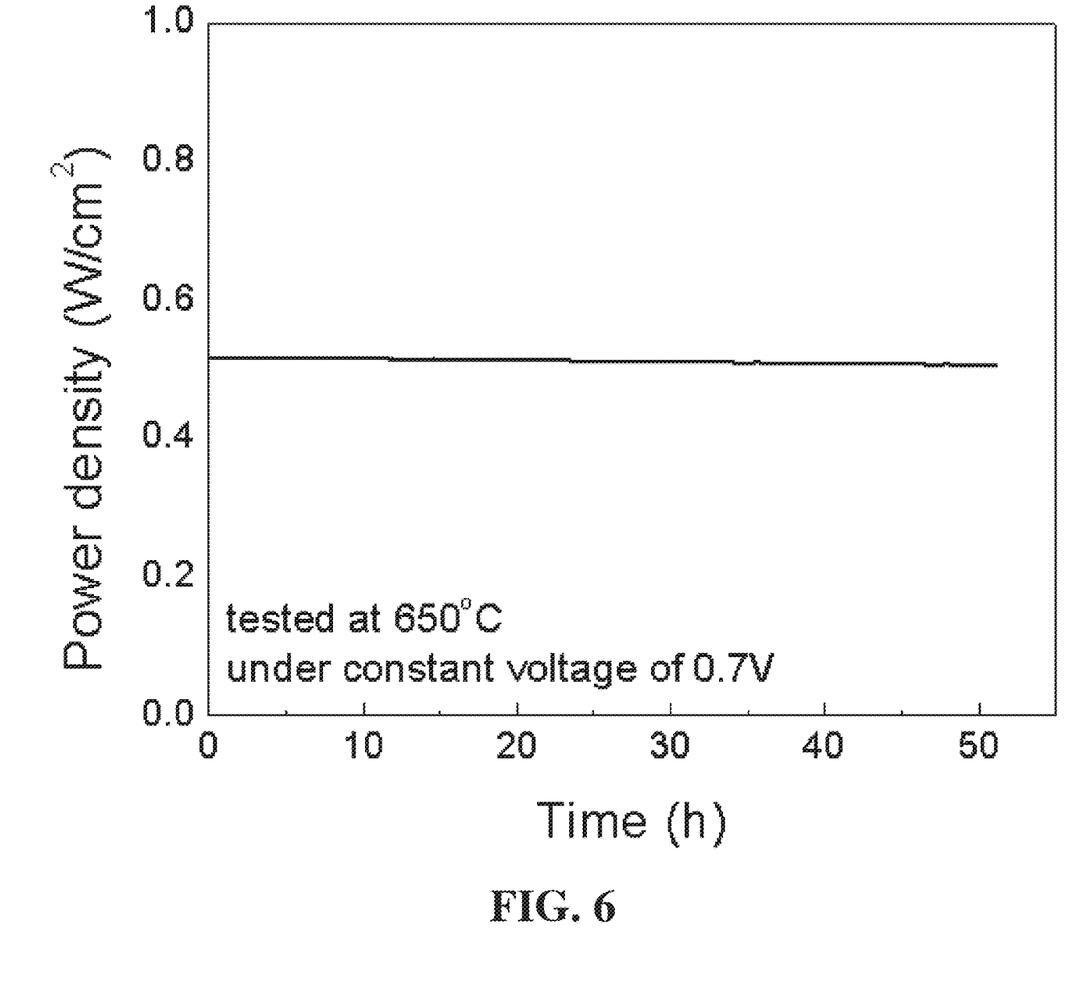
FIG. 6 illustrates a chart of time (hours) verses power density (W/cm$^2$) for the SSZ/SDC bi-layer electrolyte cell tested with humidified hydrogen and ambient air, co-fired at 1250° C., and operated at 650° C. under constant voltage of about 0.7 V, showing the stability of the SSZ/SDC bi-layer electrolyte cell under hydrogen fuel.

FIG. 6 illustrates a stability test of the SSZ/SDC bi-layer electrolyte cell with humidified hydrogen and ambient air, co-fired at 1250° C., and operated at 650° C. under a constant voltage of about 0.7 V. A stable power density output of about 0.51 W/cm² at an operating temperature of 650° C. was demonstrated during the 50+ hour test period, showing good potential for practical application in a SOFC. With humidified hydrogen as fuel and ambient air as oxidant, the SSZ/SDC bi-layer electrolyte cell achieved a fuel to electrical efficiency of about 64% at 0.8 V and an operating temperature of 650° C.

In subsequent testing, a stability test SSZ/SDC bi-layer electrolyte cell with humidified hydrogen, carbon dioxide and ambient air, co-fired at 1250° C., and measured at 650° C. under constant voltage of about 0.7 V indicated that the SOFC configuration was stable. The humidified hydrogen and carbon dioxide gases were mixed in a volume ratio of about 80:20. A stable power density output of about 0.42 W/cm² at an operating temperature of 650° C. was demonstrated during the testing, showing good potential for practical application with natural gas as fuel. With humidified hydrogen and carbon dioxide mixture as fuel and ambient air as oxidant, the SSZ/SDC bi-layer electrolyte cell achieved a fuel to electrical efficiency of about 64% at 0.8 V and an operating temperature of 650° C.

It should be noted that the performance of the new SOFC configuration can be further enhanced through surface modification process as developed in our other inventions [24].

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

DEFINITIONS

As used herein, the terms "a," "an," "the," and "said" means one or more.

As used herein, the term "about" means the stated value plus or minus a margin of error or plus or minus 10% if no method of measurement is indicated.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise," provided above.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

As used herein, the phrase "consisting of" is a closed transition term used to transition from a subject recited before the term to one or more material elements recited after the term, where the material element or elements listed after the transition term are the only material elements that make up the subject.

As used herein, the phrase "consisting essentially of" occupies a middle ground, allowing the addition of non-material elements that do not substantially change the nature of the invention, such as various buffers, differing salts, extra wash or precipitation steps, pH modifiers, and the like.

As used herein, the term "simultaneously" means occurring at the same time or about the same time, including concurrently.

REFERENCES CITED

1. Liu, M. L., et al., *Rational SOFC material design: new advances and tools*, MATERIALS TODAY 14(11) (2011) pp. 534-546.
2. Zhan, Z. L. and S. A. Barnett, *An octane-fueled solid oxide fuel cell*, SCIENCE 308(5723) (2005) pp. 844-847.
3. Huang, Y. H., et al., *Double perovskites as anode materials for solid-oxide fuel cells*, SCIENCE 312(5771) (2006) pp. 254-257.
4. Yang, L., et al., *Enhanced Sulfur and Coking Tolerance of a Mixed Ion Conductor for SOFCs: BaZr0.1Ce0.7Y0.2-xYbxO3-delta*, SCIENCE 326(5949) (2009) pp. 126-129.
5. Yang, L., et al., *Promotion of water-mediated carbon removal by nanostructured barium oxide/nickel interfaces in solid oxide fuel cells*, NATURE COMMUNICATIONS 2 (2011) p. 357.
6. Liu, M., et al., *Direct octane fuel cells: A promising power for transportation*, NANO ENERGY 1(3) (2012) pp. 448-455.
7. Zuo, C. D., et al., *Ba(Zr0.1Ce0.7Y0.2)O3-delta as an electrolyte for low-temperature solid-oxide fuel cells*, ADVANCED MATERIALS 18(24) (2006) pp. 3318-30.
8. Liu, M. F., et al., *YSZ-based SOFC with modified electrode/electrolyte interfaces for operating at temperature lower than 650 degrees C.*, JOURNAL OF POWER SOURCES 180(1) (2008) pp. 215-220.
9. Jiang, S. P. and W. Wang, *Novel structured mixed ionic and electronic conducting cathodes of solid oxide fuel cells*, SOLID STATE IONICS 176(15-16) (2005) pp. 1351-1357.
10. Liu, M., et al., *Rational SOFC material design: new advances and tools*, MATERIALS TODAY 14(11) (2011) pp. 534-546.
11. Shao, Z. P. and S. M. Haile, *A high-performance cathode for the next generation of solid-oxide fuel cells*, NATURE 431(7005) (2004) pp. 170-173.
12. Hirabayashi, D., et al., *Improvement of a reduction-resistant Ce0.8Sm0.2O1.9 electrolyte by optimizing a thin BaCe1-xSmxO3-alpha layer for intermediate-temperature SOFCs*, SOLID STATE IONICS 176(9-10) (2005) pp. 881-887.
13. Hirabayashi, D., et al., *Design of a reduction-resistant Ce0.8Sm0.2O1.9 electrolyte through growth of a thin BaCe1-xSmxO3-alpha layer over electrolyte surface*, ELECTROCHEMICAL & SOLID STATE LETTERS 7(10) (2004) pp. A318-A320.
14. Inoue, T., et al., *Study of a Solid Oxide Fuel-Cell with a Ceria-Based Solid Electrolyte*, SOLID STATE IONICS 35(3-4) (1989) pp. 285-291.
15. Eguchi, K., et al., *Electrical-Properties of Ceria-Based Oxides and Their Application to Solid Oxide Fuel-Cells*, SOLID STATE IONICS 52(1-3) (1992) pp. 165-172.
16. Zhang, X., et al., *Solid oxide fuel cells with bi-layered electrolyte structure*, JOURNAL OF POWER SOURCES 175(2) (2008) pp. 800-805.
17. Liu, M., et al., *An Efficient SOFC Based on Samaria-Doped Ceria (SDC) Electrolyte*, JOURNAL OF THE ELECTROCHEMICAL SOCIETY 159(6) (2012) pp. B1-B5.
18. Zhao, L., et al., *BaZr0.1Ce0.7Y0.2O3-δ as an electronic blocking material for microtubular solid oxide fuel cells based on doped ceria electrolyte*, ELECTROCHEMISTRY COMMUNICATIONS 13(5) (2011) pp. 450-453.
19. Tsoga, A., A. Naoumidis, and D. Stover, *Total electrical conductivity and defect structure of ZrO(2) -CeO(2) -Y(2)O(3) -Gd(2)O(3) solid solutions*, SOLID STATE IONICS 135(1-4) (2000) pp. 403-409.
20. Ding, D., et al., *High reactive Ce0.8Sm0.2O1.9 powders via a carbonate co-precipitation method as electrolytes for low-temperature solid oxide fuel cells*, SOLID STATE IONICS 179(21-26) (2008) pp. 896-899.
21. Liu, M., et al., *High-performance cathode-supported SOFCs prepared by a single-step co-firing process*, JOURNAL OF POWER SOURCES 182(2) (2008) pp. 585-588.
22. Liu, M. F., et al., *Direct liquid methanol-fueled solid oxide fuel cell*, JOURNAL OF POWER SOURCES 185(1) (2008) pp. 188-192.
23. Liu, M. F., et al., *Comparative study on the performance of tubular and button cells with YSZ membrane fabricated by a refined particle suspension coating technique*, INTERNATIONAL JOURNAL OF HYDROGEN ENERGY 35(19) (2010) pp. 10489-10494.
24. Liu, M., et al., *Solid oxide fuel cells having porous cathodes infiltrated with oxygen-reducing catalysts* U.S. patent application Ser. No. 12/837,757, filed on Jul. 16, 2010 (now issued as U.S. Pat. No. 8,802,316, issued on Aug. 12, 2014).

INCORPORATION BY REFERENCE

All patents and patent applications, articles, reports, and other documents cited herein are fully incorporated by reference to the extent they are not inconsistent with this invention.

What is claimed is:

1. A method of using a SSZ/SDC bi-layer electrolyte cell, comprising:
  providing a SSZ/SDC bi-layer electrolyte cell, the SSZ/SDC bi-layer electrolyte cell fabricated by:
    fabricating a NiO-YSZ anode substrate from a mixed NiO and yttria-stabilized zirconia by tape casting;
    sequentially depositing a NiO-SSZ buffer layer, a thin SSZ electrolyte layer, and a SDC electrolyte on the NiO-YSZ substrate by a particle suspension coating process to form an active layer, wherein the NiO-SSZ buffer layer is about 25 μm thick, the SSZ electrolyte layer is about 1μm thick, the SDC electrolyte is about 5 μm thick;

co-firing the active layer at a temperature in a range of between 1200 ° C. and 1375 ° C. to densify the electrolyte layers to at least about 96% of their theoretical densities prior to application of a cathode; and painting a SSC-SDC slurry on the co-fired SDC electrolyte layer to form a porous SSC-SDC cathode;

operating the SSZ/SDC bi-layer electrolyte cell to convert fuel to electricity, operating comprising:

providing a fuel at the anode and an oxidant at the cathode, the fuel selected from the group consisting of hydrogen, hydrocarbons, coal gas, bio-derived fuels, other renewable solid wastes and mixtures thereof, and the oxidant selected from the group consisting of air, oxygen and mixtures thereof;

maintaining the SSZ/SDC bi-layer electrolyte cell at an intermediate temperature of between 600 to 700 ° C. while operating; and achieving a fuel-to-electricity efficiency of at least 60% while operating at the intermediate temperature.

2. The method of claim 1, wherein the NiO and yttria-stabilized zirconia is mixed in a weight ratio of about 55:45.

3. The method of claim 1, wherein the NiO-YSZ anode substrate is fabricated to be about 200 to about 1000 μm thick.

4. The method of claim 1, wherein the NiO-YSZ anode substrate is pre-fired at about 850° C. for about two hours.

5. The method of claim 1, wherein the SDC electrolyte is synthesized via a carbonate co-precipitation process or other wet-chemical process to form nano to submicron particles.

6. The method of claim 1, wherein the electrolyte layers are active layer is co-fired at high temperature to densify the electrolyte membranes.

7. The method of claim 1, wherein the active layer is co-fired at less than about 1300° C.

8. The method of claim 1, wherein the SSC-SDC slurry is formed by mixing SSC and SDC powders, binder and acetone.

9. The method of claim 1, wherein the SSC and SDC powders are mixed in a weight ratio of about 7:3.

10. The method of claim 1, wherein the SSC-SDC cathode is pre-fired at about 950° C. for about two hours.

11. The method of claim 1, wherein the NiO-YSZ anode substrate is fabricated to be about 800μm thick.

12. The method of claim 1, wherein the SSZ/SDC bi-layer electrolyte cell is maintained at an intermediate temperature of between 600 to 650 ° C. while operating.

* * * * *